J. F. O'CONNOR.
FRICTION SHOCK ABSORBING MECHANISM.
APPLICATION FILED APR. 26, 1920. RENEWED MAY 2, 1921.
1,382,222.
Patented June 21, 1921.
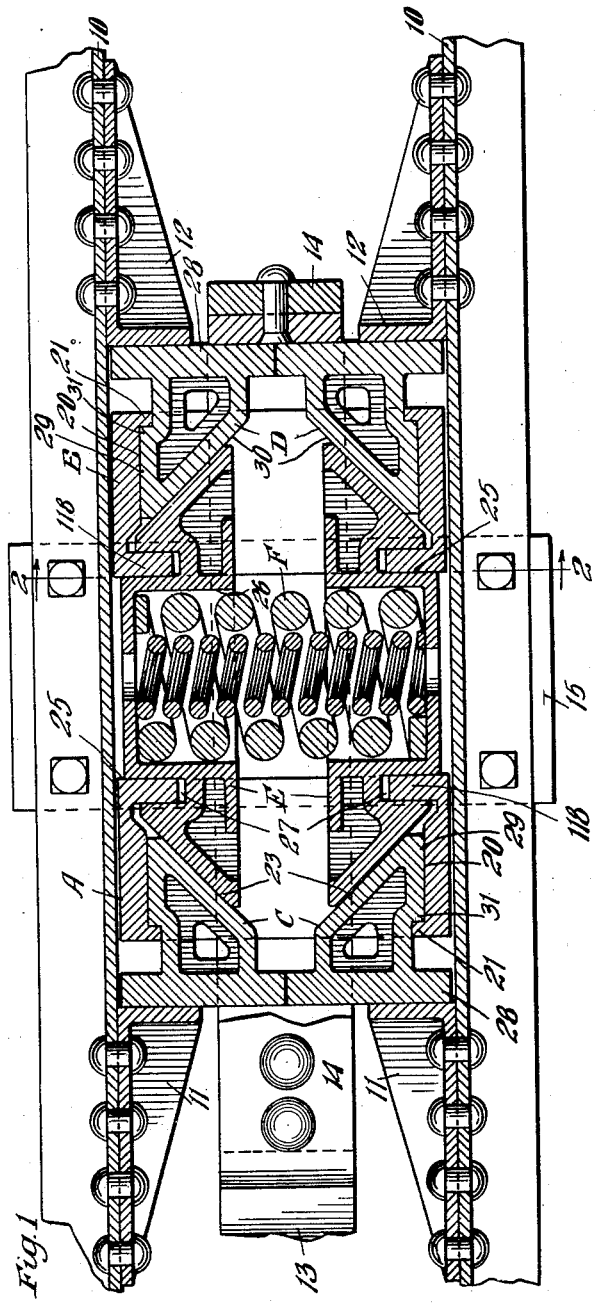
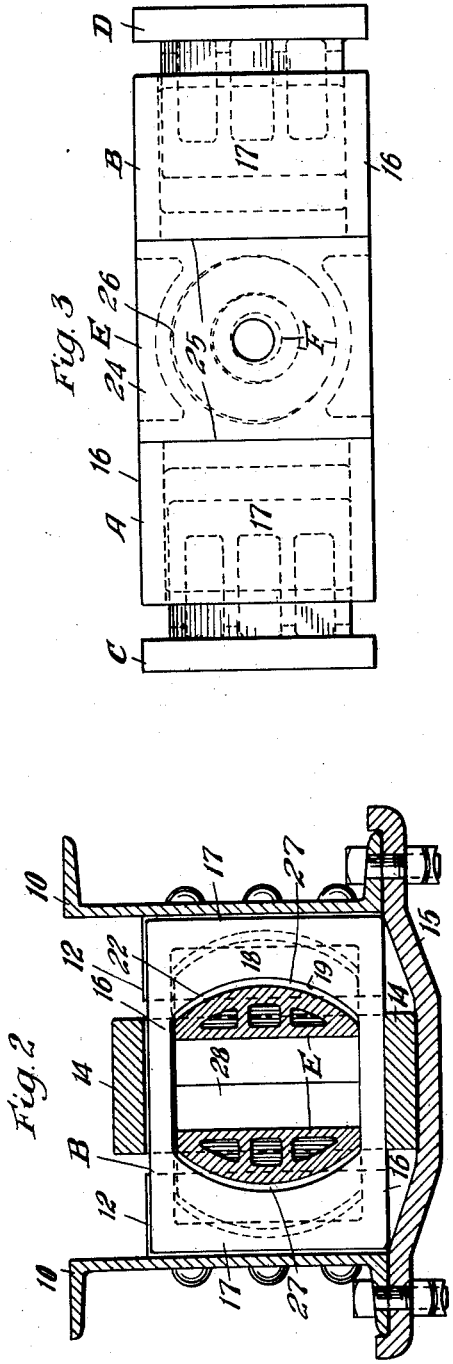
Witnesses
Wm. Geiger
Inventor
John F. O'Connor
By Geo. I. Haight
His Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,382,222.      Specification of Letters Patent.      Patented June 21, 1921.

Application filed April 26, 1920, Serial No. 376,494. Renewed May 2, 1921. Serial No. 466,220.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanism.

One object of the invention is to provide a friction shock absorbing mechanism especially adapted for railway draft riggings wherein friction surfaces extending longitudinally, transversely, and at an angle to the axis of the device, are obtained and all operable simultaneously.

Another object of the invention is to provide a shock absorbing mechanism composed of a plurality of friction shells, friction shoes, wedges, and spring means, all so designed that the parts are securely interlocked and held in assembled relation.

In the drawing forming a part of this specification, Figure 1 is a horizontal longitudinally extending sectional view of a portion of a railway draft rigging showing my improvements in connection therewith. Fig. 2 is a transverse vertical sectional view taken substantially on the line 2—2 of Fig. 1. And Fig. 3 is a side elevational view of the improved shock absorbing mechanism proper.

In said drawing, 10—10 denote channel shaped center or draft sills of a railway car to the inner faces of which are secured front lugs 11 and rear lugs 12. A portion of a drawbar is indicated at 13 to which is rigidly united a yoke 14 of well-known form. The parts of the draft rigging are supported by a detachable saddle plate 15.

The improved shock absorbing mechanism, as shown, comprises, broadly, a front friction shell A; a rear friction shell B; a front set of independent combined friction shoes and wedges C—C; a rear set of combined friction shoes and wedges D—D; a pair of laterally movable friction shoes E—E; and a transversely extending spring F.

The shells A and B are of like construction but reversely arranged and each is in the form of a substantially hollow box having top and bottom walls 16—16, side walls 17—17 and an inner end wall 18 cut away to provide a relatively large opening as indicated at 19. On its interior, each shell A and B is provided with a pair of opposed longitudinally extending friction surfaces 20—20 and with outer transversely extending shoulders 21—21. It will be noted that the openings 19 are so formed as to leave arcuate edges 22 on the opposite sides thereof on the end walls 18 and the latter therefore provide flanges as indicated at 118 in Fig. 1, at the inner ends of the shells A and B.

The friction shoes E are two in number and of like construction. Each is provided at its ends with beveled or inclined friction surfaces 23—23 and with a central rectangular section indicated at 24 in Fig. 3. The rectangular section 24 of each shoe E provides front and rear vertically extending friction surfaces 25—25 arranged at right angles to the axis of the mechanism and with which are adapted to frictionally coöperate the inner opposed faces of the walls 18—18 of the shells A and B. The interior of each rectangular section 24 is cored so as to provide a cylindrical seat 26 for one end of the spring F. It will be noted also, from an inspection of Fig. 1, that transversely extending grooves or recesses 27—27 are formed at each end of the rectangular section 24 within which are accommodated the flanges 118. The depth of the grooves 27 is made great enough so that the shoes E will not become disengaged from the shells A and B when the shoes E are forced laterally toward each other. With the construction just described, it is evident that the shoes E and shells A and B are so interlocked that they cannot be separated longitudinally after the parts are once properly assembled.

The wedge-shoes C and D are of like construction and each is provided with a half follower 28 at its outer end, a longitudinally extending outer friction surface 29 and an inclined friction wedge surface 30 at its inner end. In addition, each member C or D is formed with a transversely extending shoulder 31 adapted to coöperate with a corresponding flange 21 of the shell.

With the parts assembled as shown in Fig. 1, it is evident that the wedge-shoes C—D are limited in their outward movement with respect to the shells A and B and inasmuch as the latter are in turn interlocked with the shoes E—E so as to prevent relative longitudinal movement between the latter and the shells, the over-all length of the mechanism will be maintained. It will also be noted that a small amount of clearance is left, normally, between the bottoms of the arcuate grooves 27 and the arcuate edges 22 of the walls 18 so that, as wear occurs on the various friction surfaces, the shoes E will automatically compensate therefor by gradually working outwardly.

In operation, assuming an inward or buffing movement of the drawbar, the front wedge-shoes C—C will be forced rearwardly and the rear set of wedge-shoes D—D will be held stationary. As the rearward movement of the front wedge-shoes C—C occurs, friction will be generated between the surfaces 29 thereof and the surfaces 20 of the shell A. Simultaneously, friction will be generated between the wedge-shoes C—C and the shoes E—E and this entire action at the front end of the mechanism will be simultaneously duplicated at the rear end between the wedge-shoes D, the shell B and the friction shoes E. In addition, the shell A and shoes E will be crowded rearwardly so that, as the shoes E move laterally or transversely of the axis of the mechanism, friction will be generated between the transversely extending friction surfaces 25 of the shoes and the opposed faces of the walls 18 of the shells A and B. With this construction I obtain large wearing areas, some sets of friction surfaces extending lengthwise or parallel to the axis of the mechanism, others at an angle less than a right angle thereto, and still others at a true right angle to the axis.

Although I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with end sets of separate wedge-shoes; of laterally movable friction shoes having end wedge surfaces coöperable with said wedge-shoes; spring means interposed between said laterally movable shoes; and a friction shell at each end of the mechanism with which said wedge-shoes coöperate, said laterally movable friction shoes and shells having coöperating friction surfaces extending transversely of the axis of the mechanism.

2. In a friction shock absorbing mechanism, the combination with end sets of separate wedge-shoes; of laterally movable friction shoes having end wedge surfaces coöperable with said wedge-shoes; spring means interposed between said laterally movable shoes; a friction shell at each end of the mechanism with which said wedge-shoes coöperate, said laterally movable friction shoes and shells having coöperating friction surfaces extending transversely of the axis of the mechanism; and interlocking tongues and grooves on said laterally movable friction shoes and shells arranged to prevent longitudinal separation thereof.

3. In a friction shock absorbing mechanism, the combination with end sets of separate wedge-shoes; of laterally movable friction shoes having end wedge surfaces coöperable with said wedge-shoes; spring means interposed between said laterally movable shoes; a friction shell at each end of the mechanism with which said wedge-shoes coöperate, said laterally movable friction shoes and shells having coöperating friction surfaces extending transversely of the axis of the mechanism; interlocking tongues and grooves on said laterally movable friction shoes and shells arranged to prevent longitudinal separation thereof; and coöperating shoulders on said wedge-shoes and shells arranged to limit outward movement of the wedge-shoes with respect to the shells.

4. In a friction shock absorbing mechanism, the combination with a pair of longitudinally spaced friction shells, each shell having interior longitudinally extending friction surfaces and transversely extending friction surfaces at its inner end; a pair of laterally movable friction shoes having wedge shaped ends, each shoe being provided with a section adapted to extend between and coöperate with said transversely extending friction surfaces of the shells; coöperating means on the shells and shoes arranged to prevent longitudinal separation thereof; spring means interposed between said shoes; and a pair of independent combined friction shoes and wedges associated with each friction shell; each of said wedge-shoes having a longitudinally extending outer friction surface coöperable with a surface of the shell and also an inclined friction surface coöperable with an adjacent end of one of the laterally movable friction shoes.

In witness that I claim the foregoing I have hereunto subscribed my name this 12th day of Apr., 1920.

JOHN F. O'CONNOR.

Witness:
CARRIE GAILING.